May 25, 1954  H. OPITZ ET AL  2,679,089
PRODUCTION OF GEARS
Filed Aug. 31, 1951
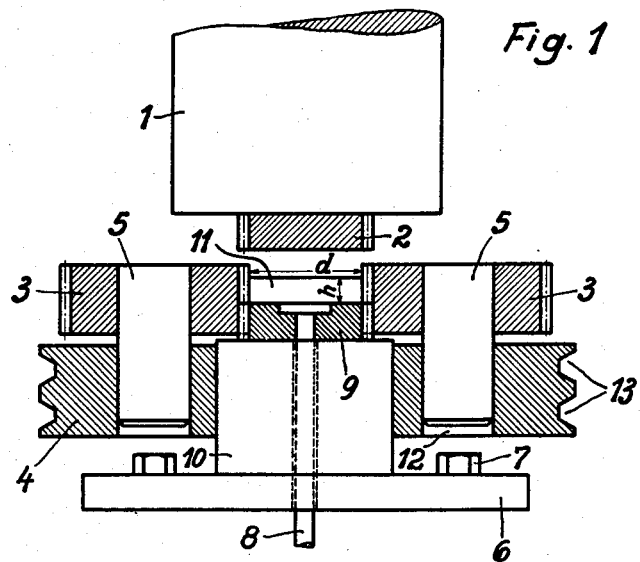
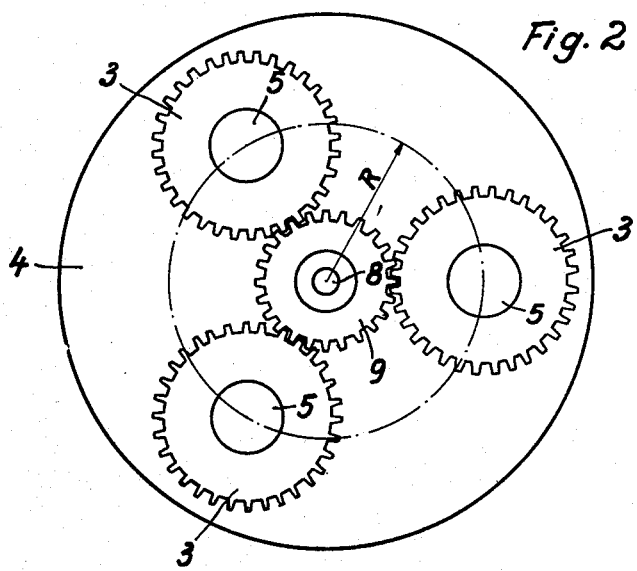
INVENTORS
HERWARD OPITZ
JOSEF HOLLMANN
BY E.J.Freeman
ATTORNEY.

Patented May 25, 1954

2,679,089

UNITED STATES PATENT OFFICE 2,679,089

PRODUCTION OF GEARS

Herward Opitz, Aachen, and Josef Hollmann, Blankenstein (Ruhr), Germany

Application August 31, 1951, Serial No. 244,574

4 Claims. (Cl. 29—35)

This invention relates to improvements in the production of gears. It more particularly relates to a method and apparatus for producing gears from a round, disk-shaped blank with spreading pressure and profiling rolls.

In the conventional method of producing gears from blanks with profiling rolls, the blank is placed between three profiling rolls which form the die. The axes of rotation of these rolls are arranged in a horizontal plane, and the rolls are arranged radially about the blank.

The rolls are moved toward the blank so as to decrease their radial distance and pressed slightly into the peripheral surface of the blank. The profiling rolls are then rotated with their axes maintained in a fixed position. The blank is worked on both sides with hammers which causes it to spread in a radial direction. The blank will rotate due to the rotary motion of the profiling rolls, and will be formed into the gear by spreading into the depressions in the profiling rolls as the blank spreads due to the hammering.

This method is by no means entirely satisfactory. The apparatus needed for carrying it out is extremely complicated. The teeth of the gears so formed are never perfect, and their face ends cannot be formed faultlessly by this method.

One object of this invention is the faultless production of gears from a disk-shaped blank using profiling rolls.

A further object of this invention is a new and simplified apparatus for forming gears with profiling rolls.

These, and still further objects will become apparent from the following description read in conjunction with the drawing, in which:

Fig. 1 shows a vertical section of an apparatus according to the invention, and

Fig. 2 shows a top elevation of the apparatus shown in Fig. 1.

According to the invention a blank is rigidly held while being subjected to a spreading pressure which will cause it to spread in a radial direction. At the same time, profiling rolls are moved in an orbit around the center of the blank while they rotate around their axes. The surfaces of the profiling rolls are so positioned from the periphery of the blank that the blank and the rolls will make contact and the gear teeth will be formed around the periphery of the blank by the profiling rolls as the blank is spread out radially due to the pressure.

The apparatus for carrying out the method in accordance with the invention should have a pressing ram for holding and pressing the blank. Profiling rolls are positioned around the ram equidistant from the center thereof for rotation in an orbit around the center. The profiling rolls are free to rotate about their own axes. Both pressure surfaces of the ram are provided with corresponding gear teeth. These gear teeth mesh with the teeth on the profiling rolls, and thus as the rolls move in their orbit around the pressure surfaces they rotate on their axes and a completely enclosed die is formed. Thus, as the ram presses the blank and spreads it radially, the gear and its teeth are formed absolutely faultlessly as the space in which the gear is formed is entirely closed, and no deformation of the teeth can occur even on their face ends.

The method and the apparatus according to the invention will be more easily understood by referring to the drawing which shows an embodiment of a machine adapted to carry out the new method. A cylindrical member 10 is firmly attached to a base plate 6 which is fastened to a foundation in any desired manner, as for example by means of the screws 7 shown. Attached to the member 10 is the stationary part of the ram 9 which is provided with teeth around its periphery.

The cylindrical member 10, and its stationary geared ram part 9 form the support for the gear blank 11. The movable ram part 2 is mounted on the movable member 1. The movable ram part 2 is provided with gear teeth around its periphery. The part 2 is formed in exactly the same manner as the part 9 and is lined up congruently with the part 9. The movable ram part 2 moves in a vertical direction towards and away from the part 9, but is never displaced at an angle to the axis from the part 9 nor allowed to rotate in relation to the part 9.

A plate 4 is rotatably positioned around the cylindrical member 10. This plate 4 may be rotated by any means, as for example, by V belts. It should be noted that the plate 4 rotates around the central axis of the entire apparatus and thus around the central axis of the disk-shaped blank 11. This plate 4 carries the pins 5 on which the profiling rolls 3 are positioned. The profiling rolls are merely shaped like gears and act on the blank 11 to produce a tooth profile. The teeth of the profiling rolls 3 are in engagement with the teeth of stationary ram part 9 so that the meshing of the gears of the profile roll 3 and the stationary ram part 9 as the plate 4 rotates will cause rotation of the profiling rolls 3 around their axes. The three profiling rolls 3 which are carried on the plate 4 will always remain the same radial distance R from the axis of rotation of the apparatus during the production of a gear. Thus, the axes of rotation of the profiling rolls 3 move in an orbit around the center of the apparatus at a distance R from this center.

Of course, the profiling rolls 3 and the members 2 and 9 may be exchanged for different size parts for the production of different gears. If the distance between the axis of rotation of any profiling roll 3 from the center of the apparatus when the gears of the profiling roll 3 and the member 9 are meshed is different from the radial distance R, when different profiling rolls and parts are used, then the pins 5 would have to be placed in additional holes 12 positioned at a different distance from the axis of rotation. The additional holes 12 may have a different hole diameter.

In order to remove the gear form from the blank 11, the ejector 8 is provided. This ejector passes through the cylindrical member 10 and the stationary ram part 9. After the gear is finished, it is removed by knocking it out by means of the ejector 8.

The drive for the rotation of the device may be effected with V belts for which corresponding V-shaped grooves 13 are provided in the cylindrical out surface of plate 4.

In operation the procedure is as follows: A disk shaped blank 11, the diameter "d" of which is smaller than the diameter of the circle contacting the tooth crests of the profiling rolls 3, and the height "h" of which is greater than the height desired for the finished gear, is placed between the profiling rolls 3. It rests on the stationary part 9 of the ram which is formed as a toothed collar. The upper ram member 1 is lowered and the movable ram part 2 formed as a toothed collar exactly in the same manner as the toothed collar 9 engages in the teeth of the profiling rolls 3. Upon the continued downward motion of the upper ram 1 with at the same time the rotation of the plate 4 and the related circular motion of the profiling rolls 3 and their rotation about their pins 5, the blank 11 is axially compressed and at the same time spreads out radially so that the blank gradually enters into the spaces between the teeth of the profiling rolls 3. The blank itself is held stationary during this compression and rolling. Due to the engagement of the teeth of the two ram collars 2 and 9 in the spaces between the teeth of the profiling roll 3, an absolutely enclosed space is formed in which the gear is produced. Due to this closed roll pass caused by the engagement of the teeth of the ram collars 2 and 9 and the profiling rolls 3, the teeth of the gear produced from the blank 11 are rolled out in a faultless manner even on their face ends.

If the gears desired are not to be of such exacting precision, the positive drive for the profiling rolls by engagement in the tooth collar 9 as shown is unnecessary.

The movable ram portion 1 is pressed downward by any known means which would be obvious to one skilled in the art such as with a hydraulic press or the like.

It is, of course, possible to make many modifications and embodiments without departing from the spirit of the invention. The terms and illustrations used herein are, therefore, in no way intended to limit the invention, the invention being limited by the appended claims or their equivalents.

We claim:
1. In a machine, for use in shaping a gear from a circular blank, in combination, a first element including a toothed support for one face of said blank, and a second element including a roller carrier arranged co-axially relative to first said element, means actuable for rotating one element relative to the other, a plurality of toothed profiling rollers being radially immovable on said carrier along the periphery of a circle co-axial with said first element, said rollers defining permanently therebetween a space of predetermined size surrounding said disc, said rollers being simultaneously revoluble each about its axis and meshing with said toothed support for planetary movement relative thereto, and means operable for exerting continuous pressure against the opposite face of said blank towards said support, whereby said blank will be squeezed in axial direction and correspondingly expand with its contour beyond limits of said space and into the path of the teeth of said rollers relative to said disc to be profiled by the teeth of the revolving rollers as one element turns relative to the other.

2. In a machine for use in shaping a gear from a circular blank, in combination, a first element including a toothed support for one face of said blank, and a second element including a roller carrier arranged co-axially relative to first said element, means actuable for rotating one element relative to the other, a plurality of toothed profiling rollers positioned on said carrier along the periphery of a circle co-axial with said first element, said rollers defining therebetween a space surrounding said disc, said rollers being radially immovable and simultaneously revoluble each about its axis and each in mesh with said support for planetary movement relative to the axis of said support, and means operable for exerting continuous pressure against the opposite face of said blank towards said support, whereby said blank will be squeezed in axial direction and correspondingly expand with its contour beyond limits of said space and into the path of the teeth of said rollers relative to said disc to be profiled by the teeth of the revolving rollers as one element turns relative to the other.

3. In a machine, as claimed in claim 2, said support comprising a profiled plate having a contour corresponding to the final profiled contour of the gear to be produced and meshing with the profiling teeth of said rollers, said pressure means including a second profiled plate movable to and from a position of pressure engagement with said opposite face of said blank and having a contour corresponding to the final contour of the gear to be produced, and operable to take up the squeezing pressure throughout the area of the expanded profiled disc.

4. In a machine, for use in shaping a gear from a circular blank, in combination, a lower die including a fixed support for one face of said disc and having the contour of the gear to be produced, a rotor journalled co-axially with said support and being movable to revolve about the same, a plurality of toothed profiling rollers each revolubly journalled along the periphery of a co-axial circle on said rotor, said rollers defining permanently therebetween a space surrounding said disc, said rollers meshing with the profiling teeth of said support for planetary movement about said disc when said rotor is turned, and pressure means including an upper die movable to a position of pressure engagement of the opposite face of said disc and having a contour matching that of said support and being in the said position in mesh with said rollers and operable with said support to squeeze said disc axially to enlarge correspondingly the contour of said disc to traverse beyond said space and into the path of the teeth of said rollers to be profiled thereby.

References Cited in the file of this patent

UNITED STATES PATENTS

| Number | Name | Date |
|---|---|---|
| 1,068,236 | Girlot | July 22, 1913 |

FOREIGN PATENTS

| Number | Country | Date |
|---|---|---|
| 358,376 | Great Britain | Oct. 8, 1931 |